(12) United States Patent
Naim et al.

(10) Patent No.: US 8,972,462 B2
(45) Date of Patent: Mar. 3, 2015

(54) DISPLAY OF TEMPORAL DATA OVER MULTIPLE ORDERS OF MAGNITUDE

(75) Inventors: Oscar Gerardo Naim, Portland, OR (US); Michael Jonathan Galos, Bellevue, WA (US); Puneet Hariharan, Bellevue, WA (US); Donald Frank Brinkman, Seattle, WA (US); Jonathan Edgar Fay, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 13/275,318

(22) Filed: Oct. 18, 2011

(65) Prior Publication Data
US 2013/0097209 A1 Apr. 18, 2013

(51) Int. Cl.
*G06F 17/30* (2006.01)

(52) U.S. Cl.
CPC ................................. *G06F 17/30551* (2013.01)
USPC ........................................... 707/805; 345/428

(58) Field of Classification Search
CPC ................... G06F 17/30286; G06F 17/30554; G06Q 10/10
USPC ............ 707/1/1, 758, 722, 104, 781; 345/428
See application file for complete search history.

(56) References Cited

U.S. PATENT DOCUMENTS

| | | | |
|---|---|---|---|
| 7,480,647 B1 * | 1/2009 | Murstein et al. ........................ | 1/1 |
| 7,567,693 B2 | 7/2009 | deCharms | |
| 8,032,554 B2 * | 10/2011 | Nishizawa et al. ........... | 707/781 |
| 2006/0221077 A1 * | 10/2006 | Wright et al. .................. | 345/428 |
| 2007/0203902 A1 | 8/2007 | Bauerle et al. | |
| 2008/0114806 A1 * | 5/2008 | Kosche ....................... | 707/104.1 |
| 2011/0032252 A1 | 2/2011 | Ohta | |
| 2011/0282866 A1 * | 11/2011 | Erickson et al. .............. | 707/722 |
| 2012/0221589 A1 * | 8/2012 | Shahar et al. .................. | 707/758 |

OTHER PUBLICATIONS

Hao, et al., "Multi-Resolution Techniques for Visual Exploration of Large Time-Series Data", Retrieved at <<http://citeseerx.ist.psu.edu/viewdoc/download?doi=10.1.1.68.6679&rep=rep1&type=pdf>>, Eurogrpahics/ IEEE-VGTC Symposium on Visualization, May 23-25, 2007, pp. 27-34.

Keim, Daniel A., "Information Visualization and Visual Data Mining", Retrieved at <<http://ieeexplore.ieee.org/stamp/stamp.jsp?tp=&arnumber=981847>>, IEEE Transactions on Visualization and Computer Graphics, vol. 8, No. 1, Jan.-Mar. 2002, pp. 1-8.

(Continued)

*Primary Examiner* — James Trujillo
*Assistant Examiner* — Thong Vu
(74) *Attorney, Agent, or Firm* — Sandy Swain; Judy Yee; Micky Minhas (57) ABSTRACT

Described herein are technologies that facilitate representing instances in time over 62 orders of magnitude as well as graphically depicting events over various time ranges and resolutions in time. A filter window is selected as a function of a resolution of a display, such filter window is applied over a representation of an instant in time. The position of the filter window along the representation of the instant in time defines a resolution in time, and such resolution in time is utilized to select graphical objects for display.

20 Claims, 6 Drawing Sheets

(56) References Cited

OTHER PUBLICATIONS

Gutwin, et al., "Interacting with Big Interfaces on Small Screens: a Comparison of Fisheye, Zoom, and Panning Techniques", Retrieved at <<http://www.designscience.ca/LODs/LOD_Hierarchy_Interactive_ElectronicPackingSlip/Resources/p145-gutwin.pdf>>, Proceedings of Graphics Interface (GI), May 17-19, 2004, pp. 145-152.

Pattath, et al., "Contextual Interaction for Geospatial Visual Analytics on Mobile Devices", Retrieved at <<http://pixel.ecn.purdue.edu:8080/~apattath/research/fall08_docs/spie09_mobilegeovis.pdf>>, Multimedia on Mobile Devices, SPIE, Jan. 19-20, 2009, pp. 1-12.

Dubinko, et al., "Visualizing Tags over Time", Retrieved at <<http://www.tomkinshome.com/site_media/papers/papers/DKM+06.pdf>>, Proceedings of the 15th International Conference on World Wide Web (WWW), May 23-26, 2006, pp. 1-11.

\* cited by examiner

0000xxxxxxxxxxxxxxxxxxxxxxxxxxxxxxx FIG. 2B xxxxxx0000xxxxxxxxxxxxxxxxxxxxxxxxx FIG. 2C ----------0000xxxxxxxxxxxxxxxxxxxxxxxx FIG. 2D ----------xxx0000xxxxxxxxxxxxxxxxxxxxxx FIG. 2E ----------xxxxxxxxxxxxxxxxxxxxxx0000 FIG. 2F

DISPLAY OF TEMPORAL DATA OVER MULTIPLE ORDERS OF MAGNITUDE

BACKGROUND

"Big History" is a field of historical study that examines history on a large scale across long time frames through a multi-disciplinary approach with a particular focus on alteration and adaptions in the human experience. Big History arose as a distinct field in the late 1980s and is related to but distinct from the field of historical study referred to as "World History", as Big History examines history from the beginning of time to the present day and into the future. Specifically, Big History attempts to unify the past from the beginning of time through the major historical regimes of Cosmic, Earth, life, and human history up to the present day. Big History offers a broad understanding of how the past has unfolded as well as the opportunity to think about what unifying characteristics there may be over history.

As the field of Big History studies all 13.7 billion years from the Big Bang to the present, a tool that facilitates the comprehension of time relationships between events, trends, and themes is desirable. Further, as a number of electronic resources and specialized online collections containing articles, images, video, sound, and other multimedia continue to grow, a tool is desirable to organize, catalog, and unify certain data relative to time.

There are several challenges corresponding to implementation of such tools. Specifically, representation of the full scope of time from the Big Bang until the present in years requires a large number, such as 13,700,000,000 in decimal, which can be stored in $10^{11}$. Accordingly, in years, representing the history of the universe is relatively easy, as even when converted to binary digits, only 34 bits are needed to represent each of the 13.7 billion years. If additional granularity with respect to time is desired, however, representing each instant in time becomes more challenging. Pursuant to an example, representing each instant in time over 13.7 billion years in the smallest units (Planck units) requires a value that is very difficult for computer systems to manage: approximately $4.3 \times 10^{62}$, which, when converted to a binary number, is a 204 bit value.

Conventionally, registers in processors and/or integers in compilers are limited to at most 64 bits. Aligning the 204 bits required to represent each Planck unit in time throughout the history of the universe to optimize prefetch queues of a processor results in utilization of 256 bits. As noted above, registers in conventional processors as well as integers in conventional compilers do not support values of such size; therefore arithmetic functions built into a processor for processing data cannot be employed over values stored across 256 bits.

SUMMARY

The following is a brief summary of subject matter that is described in greater detail herein. This summary is not intended to be limiting as to the scope of the claims.

Described herein are various technologies pertaining to extracting time-related data from a data repository based at least in part upon a representation of an instant in time resolved over multiple orders of magnitude (e.g., 62 orders of magnitude) and a filter window that is applied to such representation at a desired resolution. More specifically, an instant in time can be resolved across multiple granularities (from a Giga-anum to a Planck unit) by encoding the instant in time as a 204 bit value that is retained in a computer readable storage device that is accessible to a processor. Aligned to prefetch queues of a processor, the 204 bit value can be retained over 256 bits of storage. Such a representation of an instant in time can be referred to herein as a time representation. Accordingly, the time representation can represent the instant in time at multiple granularities, (Giga-anum, millennium, decade, day, minute, second, nano-second, etc.). The representation of the instant in time can be segmented across a plurality of registers based at least in part upon frequency of access to certain time resolutions. Time-related data can be graphical data that comprises graphical objects that describe events that occurred at certain instances in time or over specified time ranges across various levels of granularity of time.

Big History pertains to the study of the history of the universe, and therefore it is desirable to display graphical data corresponding to certain instances in time or time ranges over the history of the universe. It can be ascertained, however, that conventional display technology is unable to display graphical objects across 62 orders of magnitude. For example, 5000 items cannot be displayed horizontally on a timeline on a display that has 1280 horizontally arranged pixels. A conventional desktop display with very high resolution will have at most 3280 horizontal pixels. Accordingly, at most there are $2^{12}$ pixels on a display screen, and thus no more than $2^{12}$ points in time can be represented on the display screen along a horizontal timeline. To accommodate increasing resolution of displays over time, it can be assumed that resolution may improve four-fold. Even so, displays over the next several years will have no more than $2^{16}$ pixels horizontally, and thus no more than $2^{16}$ instances in time can be represented on a display.

Therefore, any graphical data corresponding to a time resolution outside such range can be ignored. In other words, a 16 bit value can be used as a selection window into the time representation, as there are only $2^{16}$ possible pixel values that can be displayed. 16 bits conforms to conventional processor registers and integer values, such that arithmetic functions built into a processor can be employed to operate on such data.

Therefore, given a time representation that represents a particular point in time (referred to as an origin point), a 16 bit filter window can be applied over the time representation, and the values captured in the filter window together with the origin point can be employed to locate time-related data corresponding to a desired time resolution and the origin point. In an exemplary embodiment, the origin point and the 16 bits in the filter window can be employed to retrieve graphical data that is to be displayed on the display of a computing device, wherein the graphical data represents an event corresponding to the origin point rendered at a resolution defined by a position of the filter window over the time representation.

If it is desirable to change resolution of the time representation, the filter window can be moved responsive to user input, programmatic input, or the like. The change in resolution can be accomplished by sliding the filter window in either direction along the time representation. Sliding the filter window to the right by one bit can magnify the resolution of time by an order of magnitude of two. Similarly, sliding the filter window to the left by one bit can decrease the resolution of time by an order of magnitude of two.

In another exemplary embodiment, a user or computer-executable program may wish to change the origin point. Accordingly, a query can be set forth that indicates a new origin point, and the time representation can be updated to represent the new origin point. If the origin point is set forth as a date, an algorithm can be employed to convert such date to the 256 bit scale. The origin value can be utilized as a mask to select only time-related data (graphical data) that is visible starting at the origin point at the desired resolution. The origin point can vary between 16 and 256 bits, but the size of the filter window can remain static at 16 bits. Thus, using an origin point and the filter window, graphical data corresponding to the origin point can be rendered on a display screen of a computing device at a resolution in time desired by a user or program.

Other aspects will be appreciated upon reading and understanding the attached figures and description.

DETAILED DESCRIPTION

Various technologies pertaining to displaying graphical content corresponding to instances in time represented over multiple orders of magnitude will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 1:
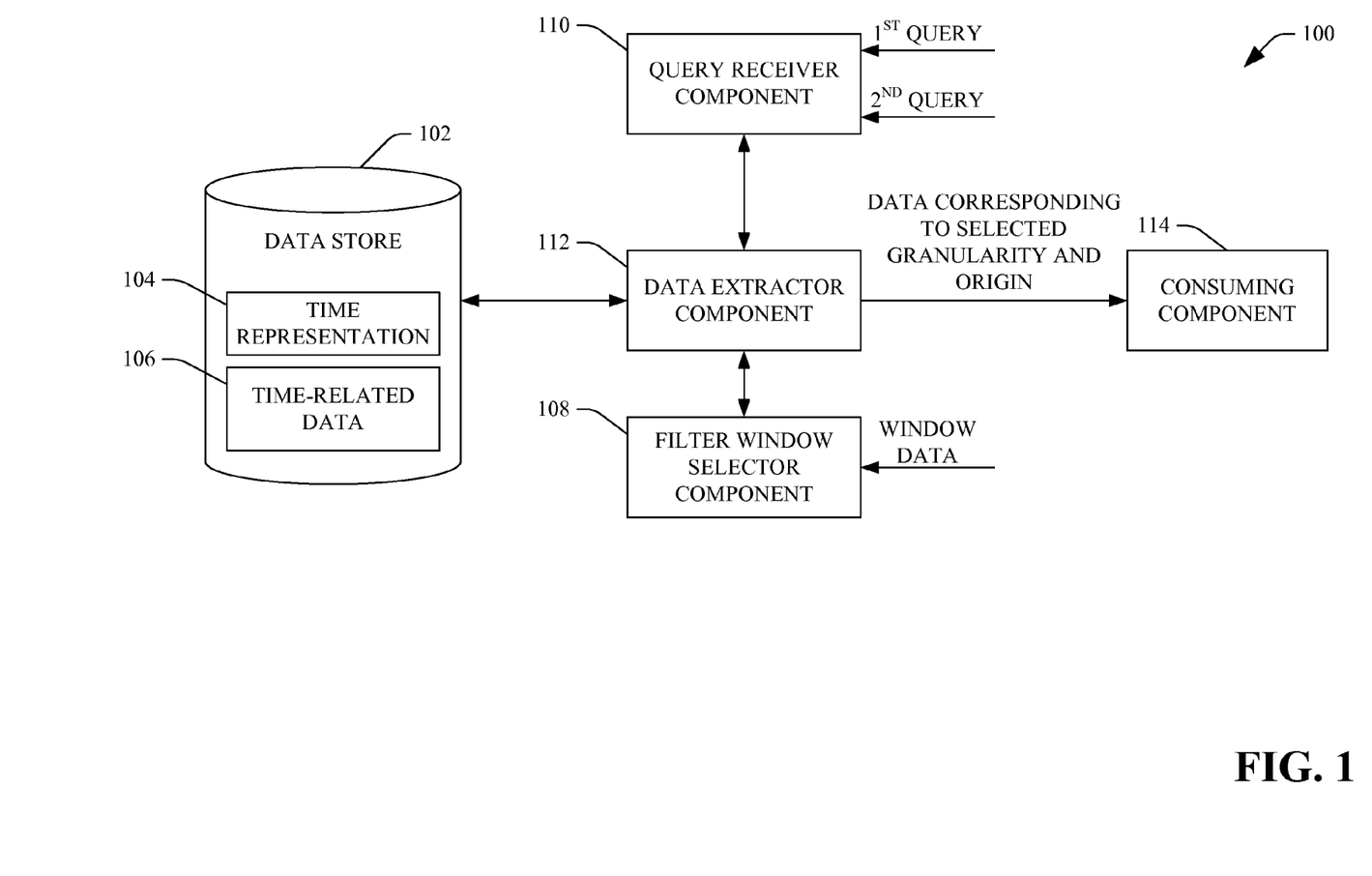
FIG. 1 is a functional block diagram of an exemplary system that facilitates displaying time-related data on a display screen that corresponds to an instant in time represented over multiple orders of magnitude.

With reference now to FIG. 1, an exemplary system 100 that facilitates provision of data to a consuming component that corresponds to an instant time and a certain granularity of time (from Giga-anum to Planck unit) is illustrated. The system 100 comprises a data store 102 that includes a time representation 104 retained therein. The time representation 104 in the data store 102 is representative of an instant in time, wherein the instant in time is resolved to a Planck unit, and can span from a Planck unit over 13 billion years ago to a Planck unit from a very recent time (e.g., 2010). For purposes of explanation, in order to represent the span of time from over 13 billion years ago to the present at a granularity of Planck units, the time representation 104 can be a relatively large number of bits. For instance, the scope of time from the Big Bang until the present includes 13.7 billion years, which is also referred to as 13.7 Giga-anum. In decimal, that is roughly 13,700,000,000, which can be stored in $10^{11}$ units. When converted to binary, to represent each year individually in binary, 34 bits are needed, such that:

11 00110000 10010101 01101001 00000000
represents a year 13.7 billion years ago; and
00 00000000 00000000 00000000 00000000
represents, for example, a current year or future year.

If it is desirable to increase the precision of time to days, then 13.7 billion can be multiplied by 365.25 (days per year), resulting in 5,003,925,000,000, which can be stored in $10^{13}$ decimal units. To represent each day using binary, 43 bits are needed.

Some events in history, however, occur in tiny fractions of a second. Therefore, it is desirable to represent the entire history of the universe, not in years, days, or even in seconds, but in the smallest possible units, which are known as Planck units. In decimal, a number of Planck units over the history of time is roughly $4.3 \times 10^{62}$. To represent each instant in time across the history of the universe at a resolution of Planck units in binary, 204 bits are needed. Aligning those 204 bits to 64-bit integer boundaries corresponding to conventional computing technologies such that a processor's prefetch queues can be optimized results in representing the history of the universe at a granularity of Planck units through utilization of 256 bits.

A 256 bit value is very large for computation purposes for conventional computer processors. Specifically, registers in processors in use today as well as integers in compilers used today do not support 256 bit values. Therefore, arithmetic functions built into conventional processors are unemployable. It can be ascertained, however, that each instant in time in Planck units can be represented by altering values of a 256 bit storage space, and the time representation 104 can be a 256 bit representation of an instant in time at a resolution of Planck units.

The data store 102 additionally comprises time-related data 106. Pursuant to an example, the time-related data 106 may be graphical data that is assigned to a certain instance in time or a range in time at a certain granularity of time. Therefore, for example, the time-related data 106 can include data that corresponds to a certain Planck unit in time or range of Planck units in time, a certain year in time or range of years in time, a certain decade in time or range of decades in time, a certain millennium in time or range of millenniums in time, etc.

Pursuant to a particular example, the time-related data 106 may be graphical data that is configured to visually depict various events/eras over the history of time at different granularities in time. For instance, the field of Big History pertains to the study of 13.7 billion years, from the Big Bang to dates in the future. Therefore, the time-related data 106 can be graphical data that is desirably displayed on a display screen of a computing device to allow for visual comprehension of time relationships between events, trends and themes. Thus, the time-related data 106 can be a relatively large piece of visual data that includes graphical information pertaining to various instances and/or ranges in time across multiple granularities in time. The time-related data 106, however, is not so limited. For example, the time-related data 106 may be textual data that describes one or more events in the history of the universe at a certain instant in time and resolution in time. In another example, the time-related data 106 may be audible data that describes an event at a certain instant in time and granularity of time. Further, the time-related data 106 may be some combination of data types that pertain to a certain instant in time and granularity of time.

While the data store 102 is shown as comprising both the time representation 104 and the time-related data 106, it is to be understood that in an exemplary embodiment, the time representation 104 may be retained in a separate data store from the time-related data 106. For instance, the time representation 104 may be included in a register of a processor while the time-related data 106 may be retained in memory that is accessible by a graphics processing unit (GPU).

In many cases, it may not be necessary to access/perform computation on an entirety of the time representation 104. Pursuant to an example, the time-related data 106 may be graphical data that includes graphical objects corresponding to various resolutions in time (e.g., from a Giga-anum to a Planck unit). Graphical objects in the time-related data 106 that can be displayed, however, are limited by the resolution of the display. In another example, the time-related data 106 may be textual data that corresponds to a particular resolution of time (e.g., a million years resolution), and a user may only be interested in data corresponding to the particular resolution in time. The system 100 comprises a filter window selector component 108 that selects a size of a filter window to apply to the time representation 104, such that an appropriate/desired resolution of the time representation 104 is selected, and data that has such resolution is captured in the filter window.

In accordance with an example, the filter window selector component 108 can receive window data from a user, a program, a display, or the like, wherein the window data indicates of a size of a filter window to apply over the time representation 104. In an exemplary embodiment, the time-related data 106 may be a relatively large graphical file that is generated to display events over the history of time at varying time resolutions. Which portions of the time related data 106 that can be displayed on a display of a computing device, however, are limited to the resolution of the display of the computing device. That is, using conventional display technology, 5000 independent events on a timeline cannot be displayed, as most conventional displays only include 1280 horizontally aligned pixels. Therefore, at most, 1280 independent events can be displayed horizontally along a timeline (1 pixel per event). A high resolution desktop screen may include 3280 horizontally aligned pixels—even so, no more than 3280 independent events can be displayed horizontally along a timeline (less than $2^{12}$ pixels). It can be assumed that over the next several years display technology will advance such that resolution of displays will continue to increase. If it is assumed that resolution of displays will increase four-fold, then no more than $2^{16}$ pixels will exist horizontally on the display, and therefore no more than $2^{16}$ independent events in time can be represented horizontally on the display. Given the above, it can be ascertained that, at most, graphical data corresponding to resolutions in time represented by 16 bits can be represented on the display. Thus, the filter window selector component can select a filter window that is no larger than 16 bits.

With more particularity, if a sliding filter window of 16 bits is positioned over 256 bits of data that represents an instant in time over 62 orders of magnitude, only graphical objects that are assigned the resolution in time corresponding to a position of the filter window over the 256 bit time representation 104 can be rendered on the display. If a graphical object is assigned a resolution in time that is smaller than the resolution of the time representation included in the filter window (e.g. nano seconds when graphical data pertaining to years is desirably displayed), then such graphical object is too small to be rendered on the display. If a graphical object is assigned a time resolution that is larger than the time resolution defined by the position of the filter window, then the graphical object is larger than the entire view of the display and therefore would not be renderable on the display (unless a tiled display wall that includes multiple, modular displays were displaying the data).

For purposes of explanation, an example is set forth below where an instant in time is represented using 64 bits and a filter window is 4 bits. In accordance with aspects described herein, however, it is to be understood that at least 150 bits can be used to represent instances in time. Accordingly, a certain instant in time can be represented as follows:
0000000000000000000000000000000000000000000000000000000000000000;
and the window can be represented as follows:
0000.

Accordingly, if it is desirable to extract data from the time-related data 106 that is assigned a largest resolution in time (at the instant in time represented by the time representation 104), then the filter window can be applied over the left-most bits in the time representation 104. A result of application of the filter window in such a manner is as follows:
0000xxxxxxxxxxxxxxxxxxxxxxxxxxxxxxxxxxxxxxxxxxxxxxxxxxxxxxxxxxxx
where "x" values are values corresponding to resolutions in time that are, for instance, too small to be represented on a display.

To access time-related data assigned to the represented instant in time at higher resolutions, the filter window can be moved to the right, effectively resulting in "zooming in" with respect to time. In an example, a power of two zoom means that at the cusp of a change is the only time that nearly full resolution is obtained; further away, nearly half of the range is wasted on clipped data. For instance, to zoom in by a magnification of 128 ($2^7$), the filter window can be shifted to the right by 7 bits:
xxxxxxx0000xxxxxxxxxxxxxxxxxxxxxxxxxxxxxxxxxxxxxxxxxxxxxxxxxxx
Thus, the data included in the newly positioned filter window is at a resolution in time that is 128 times smaller than the resolution in time of the data in the originally positioned filter window. A graphical object assigned the resolution corresponding to the newly positioned filter window, however, would (theoretically) be displayed 128 times larger on a display compared to the graphical object being displayed when the filter window is at the original position. Movement of the filter window one bit to the right causes each pixel on a display to represent half the period of time as the pixel represented before the shift, and further causes an entire visible timeline to represent half as much time. In other words, each shift to the right one bit results in the zooming in by a factor of 2 in time. When this is undertaken with a 16 bit window over a 256 bit data field, time from the beginning of time to the Planck level can be represented on a display.

As will be understood, representing an instance of time with one pixel may be difficult for a user to visually ascertain, even on a high resolution display. Accordingly, the window can be reduced such that a threshold number of pixels can be employed to represent a certain instance in time. For example, the filter window may be 4 bits, 8 bits, 10 bits, or the like.

The system 100 further comprises a query receiver component 110 that receives a first query and a second query. The first query received by the query receiver component 110 identifies a particular instant in time that is desirably loaded into the data store 102 as the time representation 104. This instant in time can be referred to as an origin point. For example, the first query may be a mouse click on a graphical display, a text query that identifies a particular instance in time (e.g., a date) or the like. For instance, the first query received by the query receiver component 110 can indicate that a user of the system 100 wishes to make a query pertaining to the date 1000 BC. Accordingly, the time representation 104 in the data store 102 can granularly identify the time 1000 BC to the resolution of a Planck unit. It can be ascertained that in many cases, the origin point can be represented by much fewer than 256 bits.

The query receiver component 110 can additionally receive a second query that identifies a resolution in time at which data assigned to the specified instant in time is desirably viewed/analyzed. Accordingly, the second query is utilized to determine a position of the filter window of the size selected by the filter window selector component 108 in the time representation 104. For instance, if it is desirable to view/analyze data in the time-related data 106 assigned to the instant in time represented by the time representation 104 at a very fine granularity (high resolution), then the filter window can be positioned over the rightmost bits in the time representation 104. If, however, data in the time-related data 106 assigned to the instant in time represented by the time representation 104 is desirably viewed at a less granular resolution in time, then the filter window can be slid to the left.

The system 100 additionally comprises a data extractor component 112 that receives the window size determined by the filter window selector component 108 and applies the filter window over the time representation 104 at a position indicated in the second query. The data extractor component 112 can extract pertinent data from the time-related data 106 that is assigned the origin point and the resolution in time defined by the first and second queries, respectively. The data extractor component 112 may then provide the extracted data to a consuming component 114. The consuming component 114 may be a computer-executable application that is executing on a computing device that can perform some computing operation over time-related data extracted from the data store 102 that corresponds to the instant in time represented by the time representation 104 at the specified resolution in time.

An exemplary application of the system 100 will now be set forth for purposes of explanation. This exemplary application is not intended to limit the scope of the hereto-appended claims. The consuming component 114 can be a rendering application that is configured to render graphical data on a display screen of a computing device, wherein such graphical data is a graphical representation of events over the history of time at various resolutions in time. For example, some of such graphical data may be assigned a relatively low resolution in time that can graphically represent for instance, the history of metalicity, which can span a Giga-anum. In another example, some of such graphical data may be assigned a relatively high resolution in time, and can represent an event that occurs at a particular instant (e.g., a Planck unit) when a star was formed.

A tool can be initialized that provides a user with a low resolution view of the history of time. In other words, as default settings, the time representation 104 can represent a midpoint in the history of time and the filter window can be applied to the time representation 104 furthest to the left. This can cause the graphical data that is representative of the entire history of the universe over time to be centered on the display of a computing device and presented at a relatively low resolution. Subsequently, the user may wish to change the view of the graphical data by selecting an origin point to be 1000 BC (through a textual query, a mouse click, a predefined link, etc.), which is loaded into the data store 102 as the time representation 104. The user may then use a mouse click, a scroll, or the like to indicate a desire to "zoom in" on the year 1000 BC to Planck unit granularity. This causes the data extractor component 112 to apply the window filter all the way to the right in the time representation 104. The data extractor component 112 may then extract graphical data corresponding to such resolution in time at the instant in time from the time related data 106, which is then passed to the consuming component 114 (the rendering application) to render the graphical data on the display screen. Various different rendering technologies can be employed to smoothly render view transitions (change of origin point, zooming in and out, etc.).

Other applications of the filtering window over the time representation 104 are also contemplated. For instance, a user may wish to obtain data corresponding to a particular granularity in time over a specified range of time. For instance, a user may wish to obtain data that occurred at a Planck unit granularity across a specified time range of one year. Such a system 100 enables the selective extraction of data assigned certain time resolutions and instances in time.

Figure 2A:
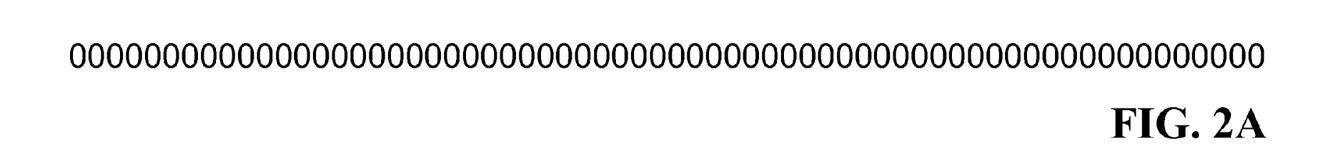
FIGS. 2A-2F illustrate an exemplary 64-bit representation of an instant in time and mask/filter operations that can be undertaken on such representation.

With reference now to FIG. 2A, an exemplary sequence of bits that can represent an instant in time is illustrated. In the example shown in FIG. 2A, 64 bits are employed to represent a particular instant in time. In accordance with aspects described herein, an instant in time can be represented over 62 orders of magnitude, and thus may be represented using 204 bits (256 bits once aligned to queues of a processor). The 64-bit representation shown in FIG. 2A is set forth for exemplary purposes only, as 256 bits can be employed to represent an instant in time.

Figure 2B:
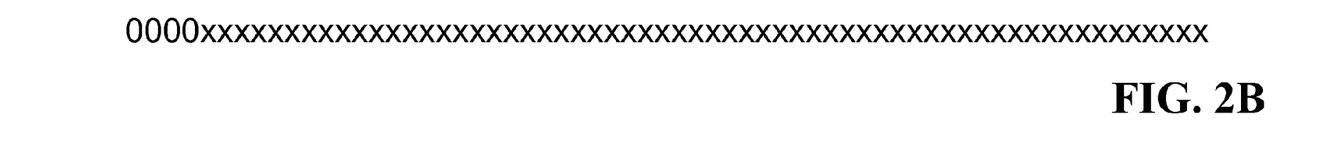

Referring now to FIG. 2B, a filter window of 4 bits is positioned over the leftmost 4 bits of the representation of the instant in time shown in FIG. 2A. The bit marked as "X"s correspond to time resolutions that are unable to be represented on a display.

Figure 2C:
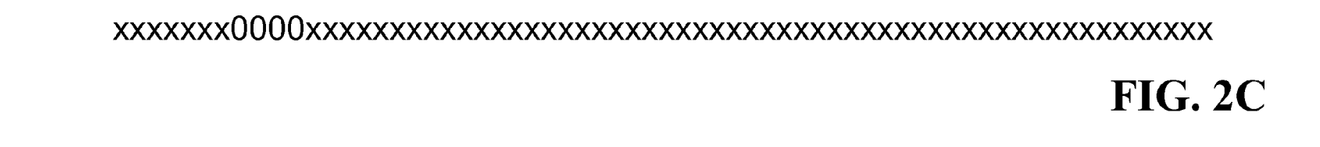

FIG. 2C illustrates the sliding of the filter window to the right over the representation of the instant in time. The "X"s to the left of the filter window correspond to time resolutions that are too large to be represented on a display while the "X"s to the right of the filter window correspond to time resolutions that are too small to be represented on the display.

Figure 2D:
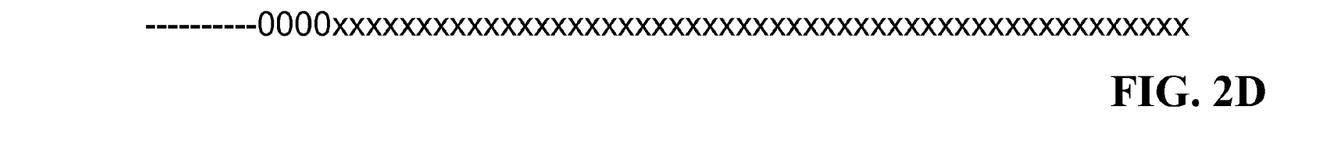

FIG. 2D illustrates a representation of an origin point in time. The represented origin point can be selected through conversion of, for instance, a common date format into the 256 bit Giga-anum scale. After the origin point has been selected, the origin point can be used as a mask to facilitate selection of time-related data that can be viewed around the origin point. Thus, the "−" values indicate that the user has selected an origin point that is $1/1024^{th}$ of the way across the timeline of the history of the universe, such that the "−" values correspond to time that is not represented on a display screen since such times are beyond the selected origin. Thereafter, the filter window can be used to define a resolution in time. Graphical objects assigned the origin point and having the resolution can then be rendered on the display.

Figure 2E:
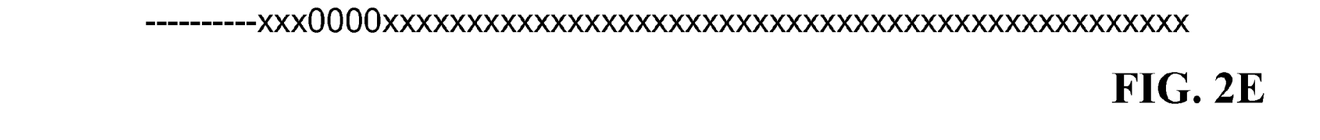
Figure 2F:
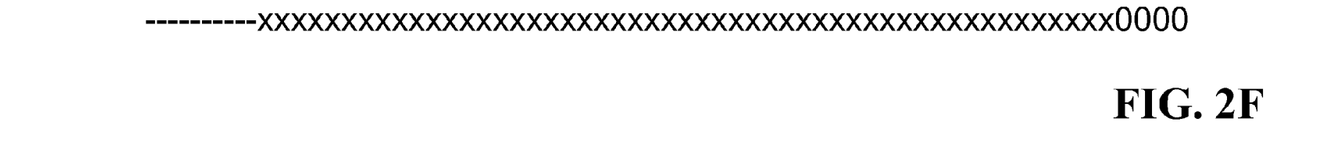

In FIG. 2E, once again, the "−" values are already excluded for being beyond the origin point in time, and the "X" values are excluded from display selection for being resolutions in time that are too large or too small to be represented on a display (given a selection of a desired resolution in time). If the highest resolution is desired, the filter window can be moved all the way to the right in the representation of the instant in time, as shown in FIG. 2F. This effectively allows the zooming in on the selected origin point at the most high resolution time unit (the Planck unit).

Figure 3:
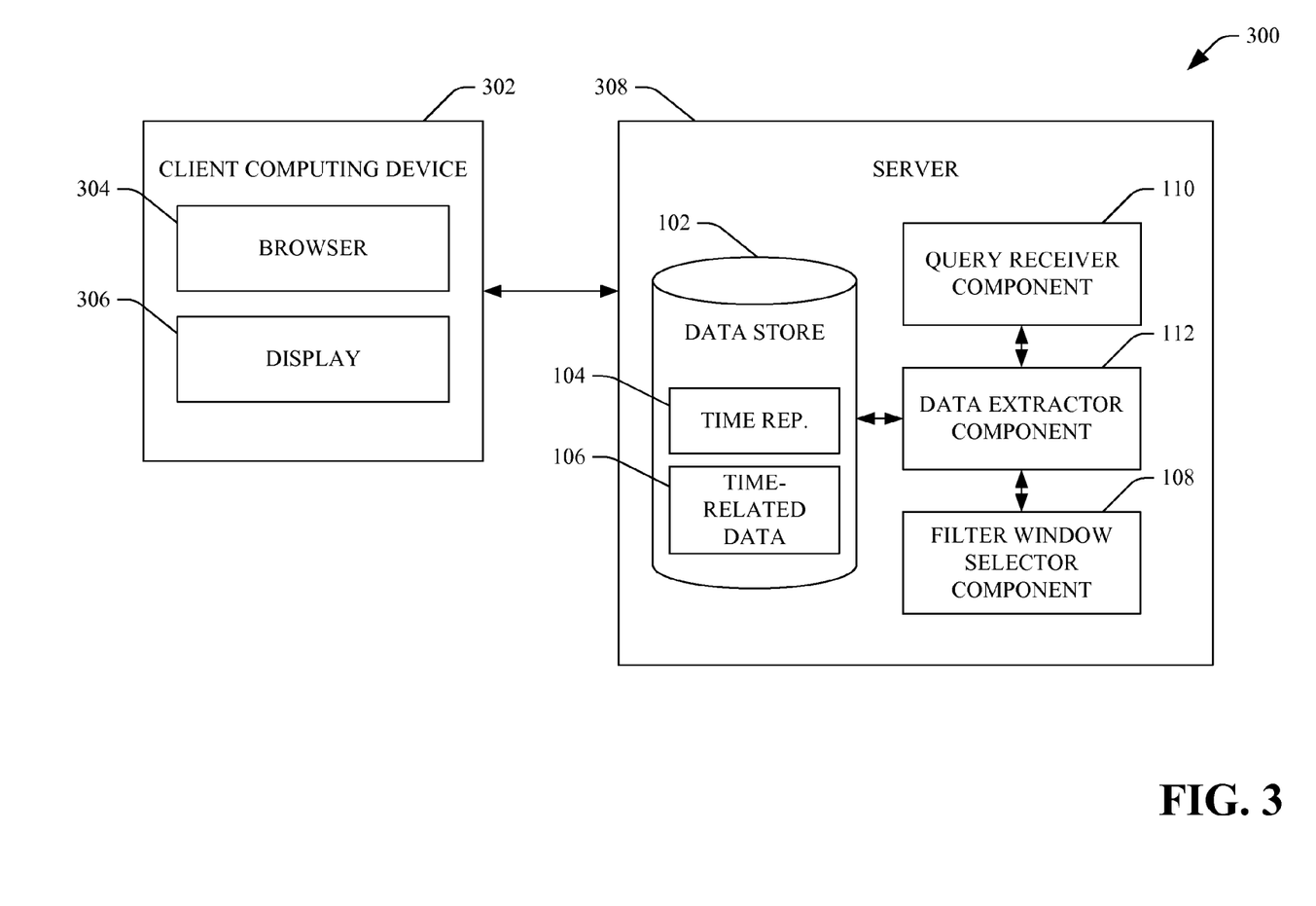
FIG. 3 is a functional block diagram of an exemplary system that facilitates providing time-related display data to a browser executing on a client computing device.

With reference now to FIG. 3, an exemplary implementation of some of the aspects described herein is illustrated. The system 300 includes a client computing device 302, which may be a desktop computing device, a laptop computing device, a tablet computing device, a portable media player, a video game console, a mobile telephone, or other suitable computing device. In the example shown in FIG. 3, the client computing device 302 has a browser 304 installed thereon as well as a display 306 in communication therewith. For instance, the display 306 may be a portion of the client computing device 302 or may be in communication with the client computing device 302 (an external monitor, a television, etc.).

Additionally, while the client computing device 302 is shown as including the browser 304, the client computing device 302 may include some other suitable application that allows the client computing device 302 to send and receive data to and from other computing devices.

As shown here, the system 300 comprises a server 308, wherein the client computing device 302 can be in communication with the server 308 by way of the browser 304. Specifically, a user of the client computing device 302 can initiate the browser 304 and cause the browser 304 to be directed to a URL corresponding to the server 308. The user of the client computing device 302 can direct the browser 304 to the server 308 by entering a URL into a URL field, selecting a link, etc.

The server 308 comprises the data store 102, which includes the time representation 104 and the time-related data 106. Here, the time-related data 106 includes a relatively large graphical object that comprises various graphical indicia representative of events corresponding to certain instances in time, or ranges of time, over various granularities in time. The server 308 further comprises the filter window selector component 108, which can receive data that is indicative of the resolution of the display 306. The higher the resolution of the display 306, the greater the size of the filter window that can be selected by the filter window selector component 108. Similarly, the lower the resolution of the display 306, the smaller the size of the filter window that is selected by the filter window selector component 108. Thus, size of the filter window is a function of the resolution of the display 306.

The server 308 also includes the query receiver component 110. Responsive to receiving an indication that the user of the client computing device 302 has directed the browser 304 to the server 308, the query receiver component 110 can set the time representation 104 to a default value, which represents a default origin point. The data extractor component 112 can then access the data store 102 and apply the filter window at a default position over the time representation 104. The data extractor component 112 can thereafter retrieve data in the time-related data 106 that is assigned to the instant in time at the default resolution, and can cause such data to be provided to the browser 304 on the client computing device 302. As indicated, the time related data 106 may be graphical data, wherein resolution of the graphical data can be defined by the window applied at the default location in the time representation 104.

The user of the client computing device 302 may then interact with the graphical data displayed to the user in the browser 304. For example, the user can select a portion of the graphical data to define a particular instant in time in which the user is interested and/or to cause the graphical data to be "zoomed in" with respect to time or "zoomed out" with respect to time. Additionally or alternatively, the user can employ voice commands, a scroll, a wheel, a slide bar, or other suitable tool to indicate an instant in time in which the user is interested and/or a resolution in time desired by the user.

The browser 304 can cause such data to be transmitted to the server 308, where it is received by the query receiver component 110. The origin point can be retained as the time representation 104, and the desired resolution defined by the user interaction with the graphical object in the browser 304 can be passed from the query receiver component 110 to the data extractor component 112, which positions the filter window over the time representation 104 at a location corresponding to the resolution in time defined by the received query. This extracted data is then provided back to the browser 304 such that the browser 304 can display the graphical data at the selected origin point with a desired granularity in time. Such process can continue, thereby allowing the user of the client computing device 302 to review graphical data pertaining to the history of the universe over multiple orders of magnitude with respect to time.

Figure 4:
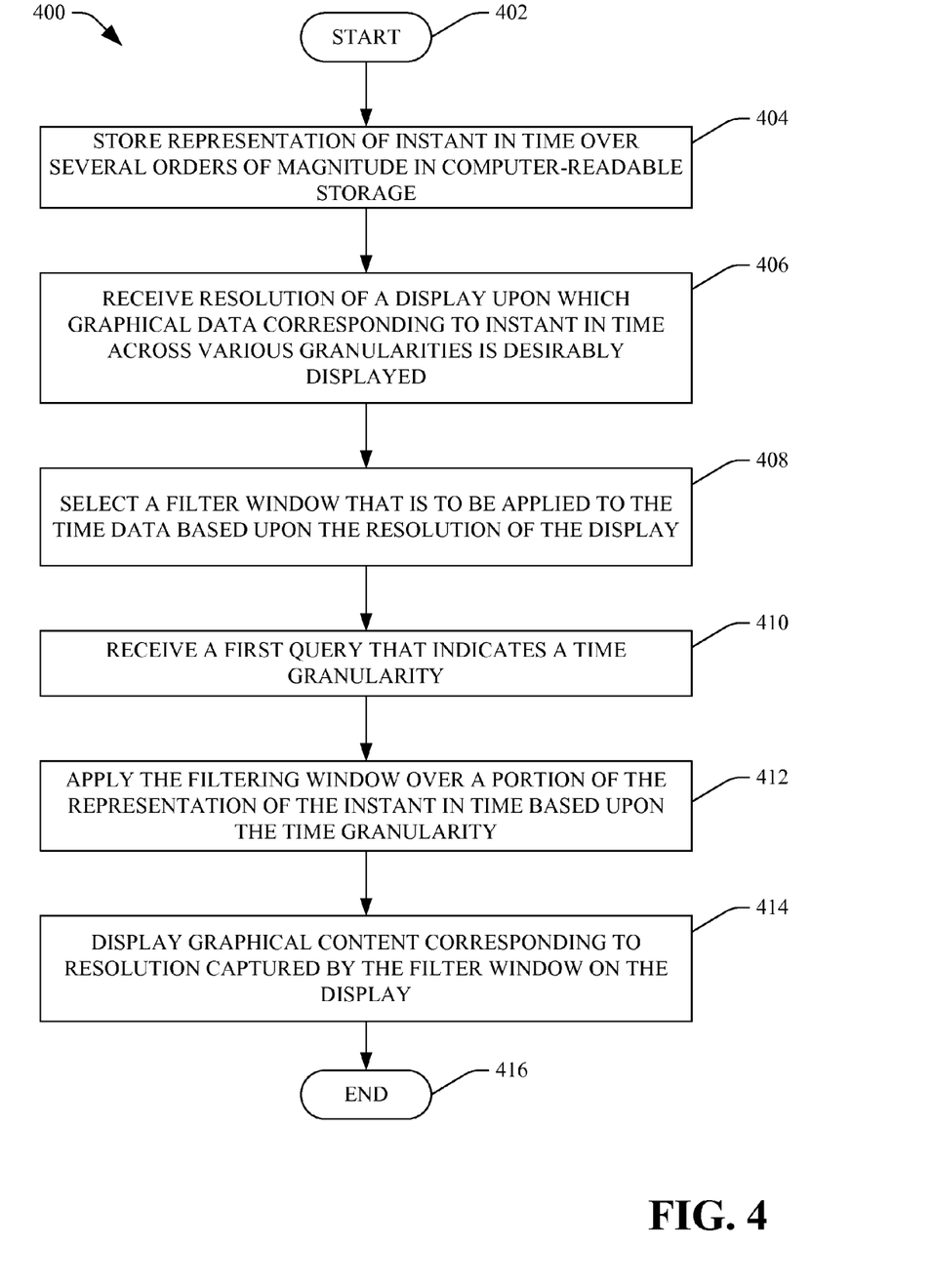
FIG. 4 is a flow diagram that illustrates an exemplary methodology for displaying graphical content corresponding to an instant in time on a display of a computing device.
Figure 5:
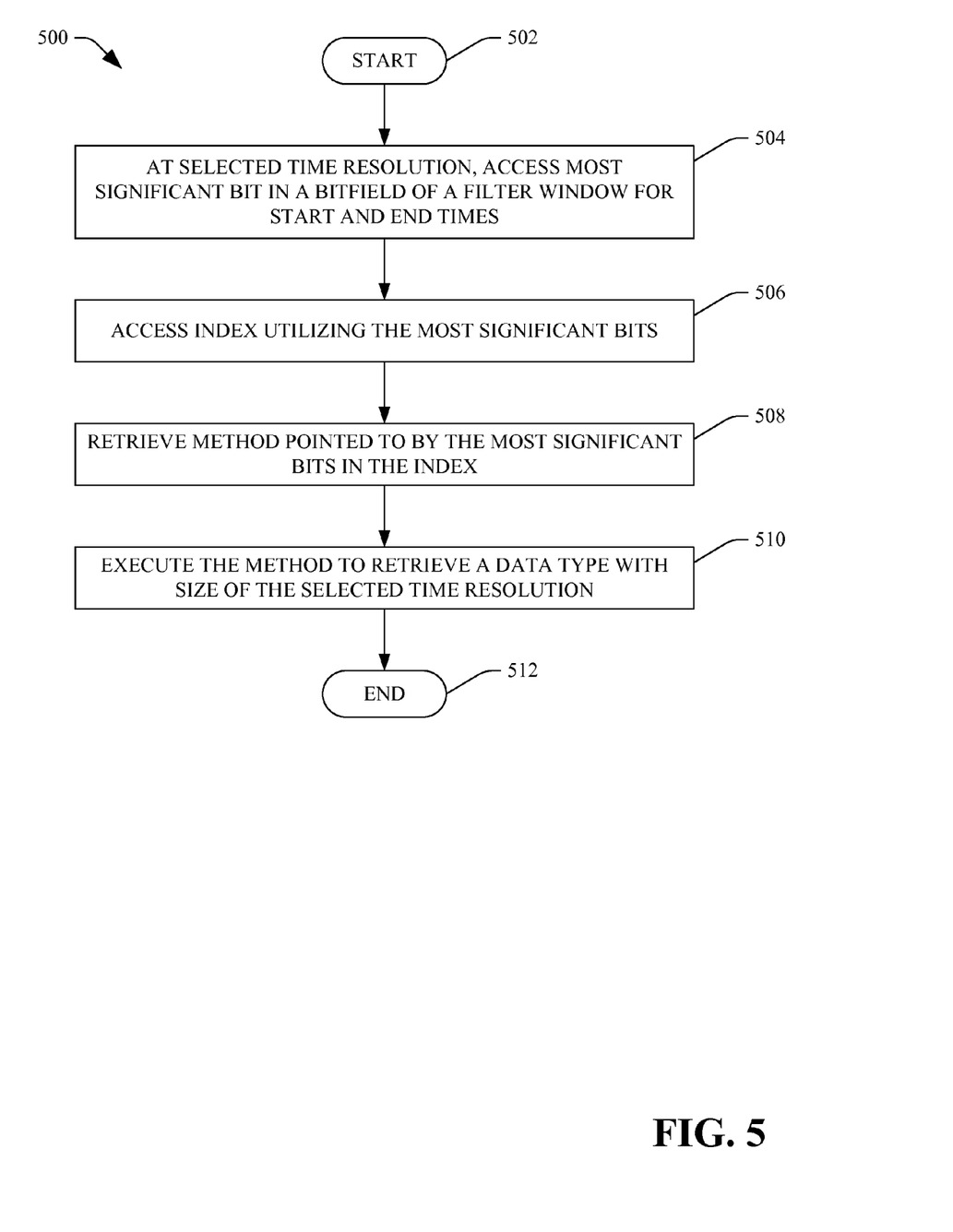
FIG. 5 is a flow diagram that illustrates an exemplary methodology for retrieving a data type through utilization of a filter window applied to a representation of time.

With reference now to FIGS. 4-5, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Referring now to FIG. 4, an exemplary methodology that facilitates displaying graphical content corresponding to an instant in time is illustrated. The methodology 400 starts at 402, and at 404 a time representation that is representative of a particular instant in time over several orders of magnitude is stored in computer readable data storage of a computing device. For instance, the time representation can be representative of an instant in time over 62 orders of magnitude (from a Planck unit to a Giga-anum).

At 406, resolution of a display upon which graphical data corresponding to the instant in time over various granularities in time is desirably displayed is received. For instance, such resolution can be a number of pixels aligned horizontally on the display.

At 408, a filter window or size of a filter window that is to be applied to the time representation is selected based upon the resolution of the display. The greater the resolution, for instance, the larger the size of the filter window.

At 410, a query is received that defines a granularity in time over which data is desirably received. At 412, the filter window is applied over a portion of the time representation based upon the time granularity defined in the query. If low granularity is desired, the filter window is applied further to the left in the time representation while if higher resolution is desired, the filter window is moved further to the right.

At 414, graphical content corresponding to the time representation is displayed on a display at the resolution in time corresponding to the position of the filter window over the time representation. The methodology 400 completes at 416.

Now referring to FIG. 5, an exemplary methodology 500 that facilitates retrieving and executing a computer-executable method is illustrated. The methodology 500 begins at 502, and a 504 at a selected time resolution (as defined by position of a filter window), a most significant bit in a bit field captured by a filter window for start and end times is accessed. More specifically, the sliding window filtering technique described above results in a bit field that includes in it a number of pixels needed to display a graphical object on a given screen at a specific resolution. Since the size of the filter window also represents a number of pixels of horizontal resolution of the screen, a high order bit of such bit field for the start date and the end date (time) can be used as an index into a table, wherein the table includes the index and a corresponding pointer to a method they can return an appropriate data type with a size corresponding to the proportionate time used by the event. Accordingly, at 506 an index is accessed utilizing the most significant bits in the bit field for the start and end times.

At 508, a method is retrieved that is pointed to by the most significant bits in the index. At 510, the method is executed to retrieve a data type with size that corresponds to the selected time resolution.

Several problems can be solved utilizing this technique. For instance, as a screen zoom level changes and with it the size on screen taken up by a time span, the resulting bit fields can also change proportionally. Further, by using the high order bit as the index, a new rendering method can be obtained for each doubling of size, with entries for 1 bit, 2 bit, 4 bit, up to the size of the screen. Additionally, by putting an entry in the table that does not return a graphic or that returns an empty transparent graphic, smaller and larger sizes can be represented by the object appearing or disappearing on zoom. Finally, by rendering different images at different sizes the display may show various types of representation of the same document as appropriate for context. For instance, for a graphical object that is to be applied to a single pixel, no rendering may occur. If, however the graphical object is to be displayed in 4 pixels, then such object can be set forth is a square. If the graphical object is to be displayed in eight pixels, such object can be rendered as an icon. Similarly, if the graphical object is to be displayed in 32 pixels, such object can be rendered as a thumbnail, and so on. The methodology 500 completes at 512.

Figure 6:
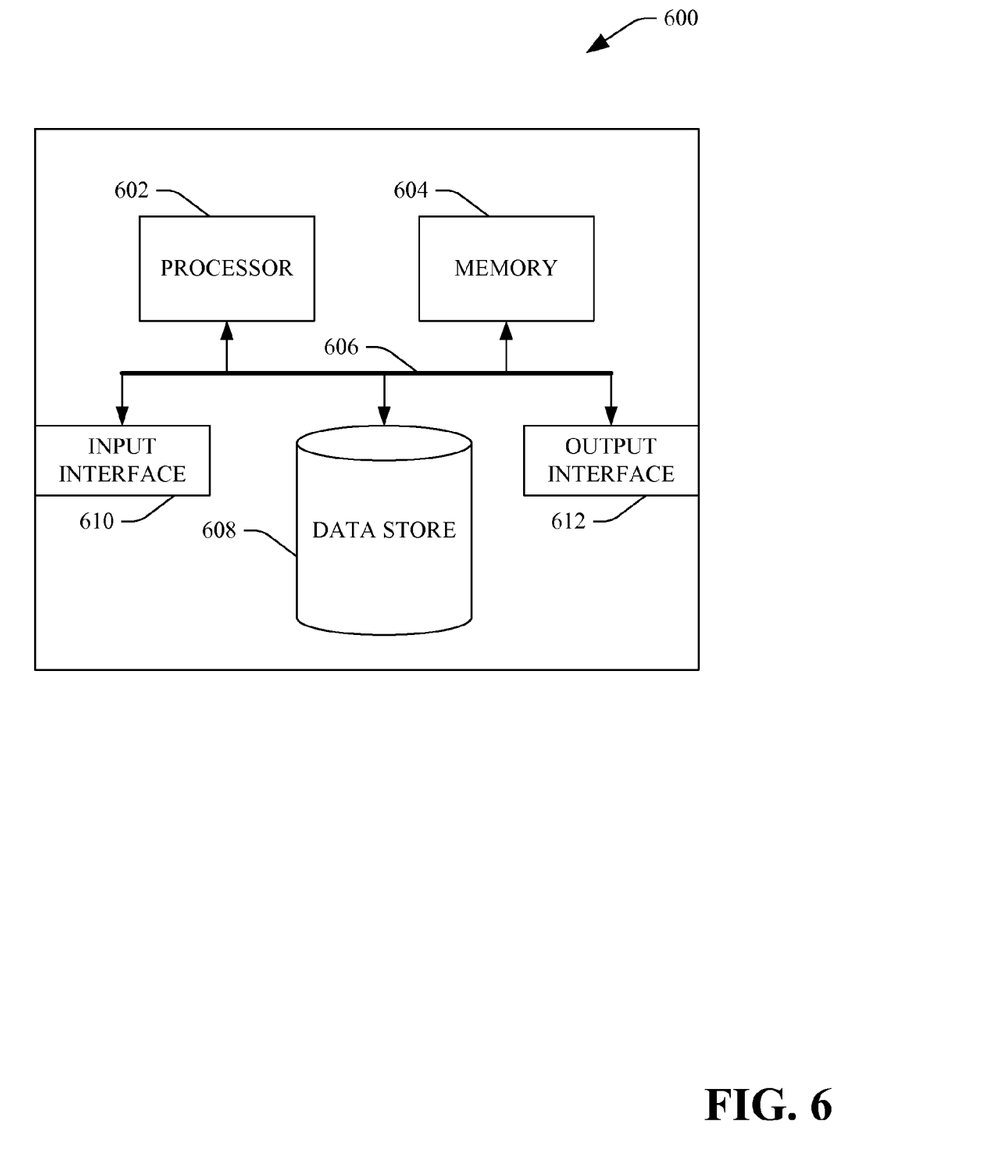
FIG. 6 is an exemplary computing system.

Now referring to FIG. 6, a high-level illustration of an exemplary computing device 600 that can be used in accordance with the systems and methodologies disclosed herein is illustrated. For instance, the computing device 600 may be used in a system that supports extracting time-related data from a data repository. In another example, at least a portion of the computing device 600 may be used in a system that supports graphically zooming in and out on objects that correspond to varying time granularities. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store graphical objects, representations of time, etc.

The computing device 600 additionally includes a data store 608 that is accessible by the processor 602 by way of the system bus 606. The data store may be or include any suitable computer-readable storage, including a hard disk, memory, etc. The data store 608 may include executable instructions, graphical objects, representations of time, etc. The computing device 600 also includes an input interface 610 that allows external devices to communicate with the computing device 600. For instance, the input interface 610 may be used to receive instructions from an external computer device, a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
selecting a filtering window that is to be applied to a representation of an instant in time based upon resolution of a display, the representation stored in computer-readable storage of a computing device, the representation represents the instant in time over several orders of magnitude, wherein first graphical content corresponds to the instant in time at a first time granularity, and second graphical content corresponds to the instant in time at a second granularity;
receiving a first query that indicates that the instant in time is to be resolved to the first time granularity;
applying the filtering window over a position in the representation of the instant in time that corresponds to the first time granularity responsive to receiving the first query; and
responsive to applying the filtering window, identifying that the first graphical content is to be displayed on the display rather than the second graphical content; and
responsive to identifying that the first graphical content is to be displayed, displaying the first graphical content on the display while refraining from displaying the second graphical content on the display.

2. The method of claim 1, wherein the several orders of magnitude are 62 orders of magnitude.

3. The method of claim 1, wherein a least significant bit in the representation of the instant in time is representative of a Planck unit.

4. The method of claim 1, wherein the representation of the instant in time has time granularities ranging from a Giga-anum to a Planck unit.

5. The method of claim 1, further comprising:
receiving a second query that identifies a second instant in time; and
updating the representation responsive to receiving the second query.

6. The method of claim 1, wherein the representation of the instant in time is segmented across a plurality of registers of a computer processor.

7. The method of claim 6, wherein the registers are 64 bit registers.

8. The method of claim 6, wherein the representation of the instant in time is segmented across the plurality of registers based upon frequencies of access of the representation at differing time granularities.

9. The method of claim 1 configured for execution on a server.

10. The method of claim 1, wherein the first query is received responsive to detecting an interaction with graphical content displayed on the display.

11. The method of claim 1, wherein the first query is received from a program executing on the computing device.

12. A system, comprising:
a data store that comprises:
a time representation that is representative of an instant in time resolved to multiple orders of magnitude; and
time-related data that comprises data that is assigned specified granularities in time;
a filter window selector component that is configured to select a size of a filter window to apply to the time representation;
a query receiver component that is configured to receive a query that defines a granularity in time; and
a data extractor component that is configured to:
apply the filter window to the time representation based upon the granularity in time defined in the query;
extract time-related data that is assigned the granularity in time defined in the query; and
provide the time-related data to a consuming component executing in a computing device while refraining from providing the consuming component time-related data assigned a granularity in time other than the granularity in time defined in the query.

13. The system of claim 12, wherein the time representation is resolved to a Planck unit.

14. The system of claim 13, wherein the time representation represents granularities in time ranging from a Giga-anum to a Planck unit.

15. The system of claim 12, the multiple orders of magnitude being 62 orders of magnitude.

16. The system of claim 12, wherein the filter window selector component is configured to receive a resolution of a display that is to display the time-related data and selects the size of the filter window based upon the resolution of the display.

17. The system of claim 16, wherein the consuming component is configured to render the time-related data on the display.

18. The system of claim 12, wherein the data store, the query receiver component, the data extractor component, and the filter window selector component are comprised by a server, wherein the computing device is a client computing device in communication with the server, and wherein the consuming component executing on the client computing device is a browser.

19. The system of claim 12, wherein the consuming component is configured to access a table using the time-series data captured in the filter window to access instructions for displaying the time-related data.

20. A computer-readable medium comprising instructions that, when executed by a processor, cause the processor to perform acts comprising:
storing a representation of an instant in time in a data repository, the representation of the instant in time being stored as a 256 bit value;
receiving a resolution of a display screen upon which graphical data corresponding to at least a portion of the instant in time is to be displayed;
selecting a filter window to apply to the representation of the instant in time based upon the resolution of the display screen;
receiving a query that defines a resolution in time;
applying the filter window over the representation of the instant in time at a position that accords to the resolution in time defined in the query;
displaying graphical data on a display screen of a computing device, the graphical data presenting information corresponding to the resolution in time defined in the query.

* * * * *